(12) United States Patent
Roth (10) Patent No.: US 12,008,785 B2
(45) Date of Patent: Jun. 11, 2024

(54) DETECTION, 3D RECONSTRUCTION AND TRACKING OF MULTIPLE RIGID OBJECTS MOVING IN RELATION TO ONE ANOTHER

(71) Applicant: Conti Temic microelectronic GmbH, Nuremberg (DE)

(72) Inventor: Axel Roth, Ulm (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 359 days.

(21) Appl. No.: 17/596,245

(22) PCT Filed: May 28, 2020

(86) PCT No.: PCT/DE2020/200040
§ 371 (c)(1),
(2) Date: Dec. 6, 2021

(87) PCT Pub. No.: WO2020/244717
PCT Pub. Date: Dec. 10, 2020

(65) Prior Publication Data
US 2022/0319042 A1 Oct. 6, 2022

(30) Foreign Application Priority Data

Jun. 5, 2019 (DE) .................... 10 2019 208 216.5

(51) Int. Cl.
*G06T 7/579* (2017.01)
*G06T 7/73* (2017.01)
*G06T 7/80* (2017.01)

(52) U.S. Cl.
CPC ............... *G06T 7/73* (2017.01); *G06T 7/579* (2017.01); *G06T 7/80* (2017.01)

(58) Field of Classification Search
CPC .. G06T 7/73; G06T 7/579; G06T 7/80; G06T 7/246; G06T 7/0002; G06T 7/20; G06T 2207/30241; G06T 17/00
See application file for complete search history.

(56) References Cited

U.S. PATENT DOCUMENTS

2013/0265387 A1 10/2013 Jin
2019/0301871 A1* 10/2019 von Stumberg ....... G06V 20/10

FOREIGN PATENT DOCUMENTS

| CA | 3083430 A1 * | 9/2019 | ......... G06K 9/00664 |
|---|---|---|---|
| DE | 102006013318 A1 | 9/2006 | |
| DE | 102016212730 A1 | 1/2018 | |
| EP | 3474230 A1 | 4/2019 | |
| JP | 2002367077 A | 12/2002 | |
| JP | 2011096216 A | 5/2011 | |

(Continued)

OTHER PUBLICATIONS

Runz, Martin, Maud Buffier, and Lourdes Agapito. "Maskfusion: Real-time recognition, tracking and reconstruction of multiple moving objects." In 2018 IEEE International Symposium on Mixed and Augmented Reality (ISMAR), pp. 10-20. IEEE, 2018. (Year: 2018).*

(Continued)

*Primary Examiner* — Carol Wang (57) ABSTRACT

The disclosure relates to a method and a system for the detection, 3D reconstruction and tracking of multiple rigid objects moving relative to one another from a series of images from at least one camera and can be used, in particular, in the context of a camera-based environment detection system for assisted or automated driving.

12 Claims, 5 Drawing Sheets

(56) References Cited

FOREIGN PATENT DOCUMENTS

JP            2013257630 A     12/2013
JP            2017130871 A      7/2017

OTHER PUBLICATIONS

Martin, Frederick, and Radu Horaud. "Multiple-camera tracking of rigid objects." The International Journal of Robotics Research 21, No. 2 (2002): 97-113. (Year: 2002).*
German Search Report dated Apr. 30, 2020 for the counterpart German Patent Application No. 10 2019 208 216.5.
The International Search Report and the Written Opinion of the International Searching Authority dated Sep. 11, 2020 for the counterpart PCT Application No. PCT/DE2020/200040.
Engel, Jakob et al., "Direct Sparse Odometry", Version 2.07, Oct. 7, 2016, Cornell University Library, XP080713067.
Ranftl, Rene et al., "Dense monocular depth estimation in complex dynamic scenes" IEEE Conference on Computer Vision and Pattern Recognition, (CVPR), Jun. 27-30, 2016—Las Vegas, NV, USA, S.4058-4066.—ISSN 1063-6919.
Newcome, Richard A et al., "DTAM; Dense tracking and mapping in real-time", 2011 International Conference on Computer Vision, Nov. 2011 (Nov. 2011), Seiten 2320-2327, XP055405826.
Engel, Jakob et al., "Large-scale direct SLAM with stereo cameras", 2015 IEEE/RSJ International Conference on Intelligent Robots and Systems (IROS), Sep. 28-Oct. 2, 2015, DOI: 10.1109/IROS.2015.735363.
Japanese Office Action dated Sep. 9, 2022 for the counterpart Japanese Patent Application No. 2021-568783.

* cited by examiner

DETECTION, 3D RECONSTRUCTION AND TRACKING OF MULTIPLE RIGID OBJECTS MOVING IN RELATION TO ONE ANOTHER

TECHNICAL FIELD

The technical field relates to a method and a device for the detection, 3D reconstruction and tracking of multiple rigid objects moving relative to one another from a series of images from at least one camera and can be used, in particular, in the context of a camera-based environment detection system for assisted or automated driving.

BACKGROUND

The following methods for the detection, 3D reconstruction and tracking of objects from image data of an (individual) camera are known:

Structure From Motion (SFM):

Widespread approaches for extracting a 3D structure from video data utilize indirect methods: image correspondences of multiple camera images are identified as a preprocessing step. The epipolar geometry, 3D structure as well as the determination of the relative movement of the camera are only established in the following steps. The term "indirect method" is used to describe a two-stage process, in which the optical flow is calculated first of all and, thereafter, the 3D structure is calculated from the flow (SFM).

Bundle Adjustment:

Bundle adjustment is used for the optimization of the structural and movement parameters with the aid of multiple images. A geometric error of the point or line correspondences is minimized, for instance the rear projection error.

Photometric Bundle Adjustment:

Photometric bundle adjustment optimizes the structure and movement on the basis of a probabilistic photometric error model with the aid of image intensities and gradients:

Alismail et al., Photometric Bundle Adjustment for Vision-Based SLAM, arXiv: 1608.02026v1 [cs.CV], 5 Aug. 2016.

Photometric bundle adjustment is applied to single-object problems (e.g., moving camera+rigid, unmoving surroundings); this corresponds to the problem of visual odometry (VO) or self-localization and mapping (SLAM).

Direct Sparse Odometry (DSO) by Engel et al., arXiv: 1607.02565v2 [cs.CV], 7 Oct. 2016 is a method, in which a direct probabilistic model (minimizing of a photometric error) is combined with a consistent, collective optimization of all model parameters, including structural geometry as an inverse depth of points in a reference image, camera trajectory, and an affine sensor characteristic per image, focal length and principal point. Tracking by means of direct 3D image alignment and photometric bundle adjustment is used to realize visual odometry, wherein a static scene is assumed. For one-off initializing, a coarse-to-fine bundle adjustment is used, based on two camera images. DSO does not utilize any keypoint correspondences and utilizes either an individual camera or a stereo camera system.

SFM with Multiple Objects:

Known methods for 3D reconstruction of multiple objects are, by way of example, keypoint-based methods, wherein a sparse flow field is calculated in advance as well as methods which are based on a dense optical flow field calculated in advance.

In Dense Monocular Depth Estimate in Complex Dynamic Scenes, DOI: 10.1109/CVPR.2016.440, Ranftl et al. show the reconstruction of moving objects together with their surroundings. To this end, a motion segmentation with a pro-pixel assignment to different movement models is performed, based on a dense optical flow calculated in advance.

It is an object of the invention to provide improved object detection, 3D reconstruction and tracking for multiple objects moving relative to one another based on images from one camera or based on images from multiple rigidly connected cameras.

The following considerations form a starting point:

Indirect methods are subject to the direct, photometric approach in certain regions and scenarios, as regards accuracy and robustness. In the case of multi-object SFM approaches, a reduced accuracy in the measurement leads to increased regions with ambiguities which, in turn, leads to false object clustering. For instance, only slightly differently moving objects cannot be recognized as two objects. Ultimately, the quality of the object clustering/the recognition of moving objects is limited by the uncertainties in the error distribution of the optical flow determined in advance, which are associated with the indirect approach, and in the case of the sparse optical flow, likewise by the low density of the keypoint quantity. This leads to:

1. A restricted minimal spherical angle per movement model (➔ high minimal object size/small maximal object distance),
2. Increased minimal movement direction deviation which can be detected by the method, and
3. Restricted applicability in situations having few keypoints.

SUMMARY

To start with, aspects of the disclosure and its embodiments are described below:

1. Detection and Tracking of Multiple Rigid Objects by Means of Direct 3D Image Alignment and Photometric Multi-Object Bundle Adjustment as an Online Method on the Basis of a Selection of Key Cycles and Selection of Pixels (Sparse)

The disclosure extends the method, as used in particular for direct sparse odometry (DSO), by methods for object clustering, for identifying all rigid objects moving in various ways in camera videos (the entire rigid stationary surroundings can, in this case, be referred to as one object), which are combined in an adapted form with an extended photometric bundle adjustment. The result includes both the determination of the trajectory and structure of self-moving objects, and the movement of the camera system relative to the unmoving surroundings, as well as the structure of the unmoving surroundings.

Online Method:

Although a collective optimization of all parameters is carried out on the basis of image data from multiple times, the method is suitable for simultaneous use during the data detection (in contrast to the use of bundle adjustment as a batch method following the data detection). The method is also suitable for detecting objects which are only temporarily visible.

Sparse, without Regularization:

Only those pixels which presumably make a relevant contribution to, or provide a relevant constraint for, solving the trajectory estimates of all objects are selected in order to reduce the computational cost for the photometric bundle adjustment. As a general rule, these are points fewer by orders of magnitude than there are pixels in the input images. No regularization terms for regularizing the depth estimates are required, and the associated potential systematic errors are avoided.

At the core of the method, a collective optimization (maximum a posteriori estimation) of the following parameters is carried out:

Depths of multiple selected points of multiple selected images, for multiple objects, represented by the inverse depth (1 parameter per point and object) - - -

Optional: normal vector of each selected point for multiple objects (2 parameters per point and object)

Number of movement models

Trajectory of each movement model (position or 3D position and 3D rotation for each key cycle)

Assignment of selected points to movement models (1 parameter per point and movement model, by means of soft assignment or hard assignment)

Estimation of (e.g., affine) sensor characteristic per image (not indicated below for reasons of legibility; see, for example, Engel et al. DSO Chapter 2.1 Calibration), and Estimation of focal length and principal point (not indicated below for reasons of legibility; see, for example, Engel et al. DSO Chapter 2.1 Calibration).

The error function $$E := E_{photo} + E_{comp} + E_{geo}$$

is minimized with the photometric error of the quantity of selected unconcealed pixels $E_{photo}$, an a priori term $E_{comp}$, with assumptions regarding the composition of the scene from multiple movement models, as well as $E_{geo}$ with a priori assumptions regarding the geometry of individual objects.

The photometric error term is defined by way of $$E_{photo} := \sum_{m \in M} g^m \sum_{i \in F} \sum_{p \in P_i} \rho_p^m \sum_{j \in obs(p)} E_{pj}^m$$

With the photometric error $E_{pj}^m$ of an observation in image j of a point p regarding a movement model m $$E_{pj}^m := \sum_{n \in N_p} w_n \left\| I_j(\pi_j^m(n, id_p^m)) - I_i(n) \right\|_\gamma$$

In this case, M is the quantity of movement models, $g^m$ is an optional weighting on the basis of an a priori model of the geometric errors of the camera model, which have different effects as a function of the object size, F is the quantity of all images in the dynamic bundle adjustment window, $P_i$ is the quantity of all active points of the image i, obs(p) is the quantity of all other images with observations of the point p. $w_n$ is a weighting of the pattern points n (vicinity $N_p$ around p), $I_i$ and $I_j$ designate gray-scale values of two images, $\pi_j^m$ is the projection of a point n into a camera image j by means of the movement model m and assigned inverse depths $id_p^m$. $\rho_p^m$ designates the probability of affiliation of a point to the movement model m, wherein the following applies:

$$\sum_{m \in M} \rho_p^m = 1, \rho_p^m \geq 0$$

$\|.\|_\gamma$ designates the Huber standard.

Since the number of movement models cannot in general be observed, the minimal number should be preferred. Regarding this, an a priori term $E_{comp}$ is defined, if applicable according to parameters, with assumptions regarding the probability distribution of the number of objects. For instance, $E_{comp}$ can be a strictly monotonically increasing function of the number of objects or can be based on the criterion of the minimum description length.

The a priori term $E_{geo}$ can represent geometry assumptions, for instance a compactness requirement of objects in order to counter ambiguities in clustering. E.g., a probability is modeled for object affiliations which deviate from one another (that is to say, for object boundaries) when viewing each pair of neighboring points. As a result, object segmentations with as few object boundaries as possible are preferred. The term can be omitted, for instance in application scenarios with few ambiguities.

In order to ascertain the observability or the quantity obs(p), projections outside the image edges or with negative depth (in the target camera) are first removed. In order to ascertain concealments by other structures, e.g., the photometric error of each projection is evaluated, or the concealment analysis is used (see "concealments").

Optimization

In order to optimize the error function, Levenberg-Marquardt is used alternately for trajectory and structural parameters in the case of a fixed object assignment (this corresponds to the photometric bundle adjustment per object), and subsequently, in the case of a fixed geometry and fixed number of objects, for instance the interior-point method is used (when using soft assignment), or, for instance, graph cut is used to optimize the affiliations. For this purpose, depth parameters of each selected point are required for external objects; these can be optimized in advance, provided they have not been optimized during the bundle adjustment.

In a superordinate optimization loop, the structure, trajectory and object assignment are first alternately and repeatedly optimized as described until convergence is achieved, and then, in order to optimize the number of movement models, hypotheses for new configurations (objects and the point assignment thereof) are formed in such a way that a reduction in the total error is to be expected. New configuration hypotheses are evaluated in accordance with the initialization method [see also FIG. 4].

Key Cycle Management

The optimal selection of images from the image data stream for utilization in bundle adjustment can be object-specific. An exemplary strategy would be: an object is almost at rest → choose a very low key cycle frequency, another object is moving quickly → choose a high key cycle frequency.

Possible Problem:

Clustering parameters cannot be optimized since the photometric error term cannot be established for all objects for the union of all key cycles, because the object position in the bundle adjustment is only established for the object-specific key cycles.

Possible Solution:

For all objects, the positions are established by means of direct image alignment for all external key cycles (which are, in each case, not object-specific). Only the position is established at these times without optimizing the structure. The photometric error term, which is required for optimizing the point-movement model assignment, can now be established for each point and each movement model regarding each own and external key cycle.

If the selection of the key cycles has not been changed for any object in a cycle, no new data will result for the subsequent optimization. In this case, the cycle is reduced to pure tracking or estimation of the position of the objects via direct image alignment.

Formation of Hypotheses (1): Detection of a Further Movement Model

A further movement model or a further differently moving object is detected using the following method: hypotheses for object configurations (a hypothesis H is a specific quantity or assumption of all model parameter values) can be formed on the basis of an analysis of the (photometric) errors of additional, more densely scattered points with optimized depths (these additional points are not involved in the photometric bundle adjustment). Local and temporal accumulations of high errors of a fully optimized hypothesis $H_{old}$ (for instance the configuration of the last iteration) are established and, if applicable, a new hypothesis $H_{new}$ is defined, wherein the new hypothesis contains a further object in the region of the established error accumulation. The criterion for setting up and evaluating a new hypothesis could be defined as follows:

$$E_{comp}(H_{new}) + E_{geo}(H_{new}) + C_{photo}(H_{new}) < E(H_{old})$$

wherein $C_{photo}(H_{new})$ is a heuristic estimate of the expected photometric error of the new hypothesis, for instance based on a priori assumptions and the established error accumulations. Initially, only a heuristic estimate $C_{photo}(H_{new})$ is used, since the structure and trajectory of the new object are not yet known exactly. An evaluation of the hypothesis (and, therefore, the estimation of $E_{photo}(H_{new})$ and E ($H_{new}$)) happens during the optimizations of the initialization. The hypothesis is rejected during the coarse-to-fine initialization if the total error becomes larger compared to the total error of another fully optimized hypothesis (for instance, the configuration of the last iteration). A final hypothesis that has not been rejected becomes the new configuration for the current cycle.

A modeling of concealments, which is described below, is important when forming hypotheses in order to avoid false-positive detections by concealments.

Formation of Hypotheses (2): Elimination of a Movement Model

Inasmuch as it is ascertained that too many objects are assumed, that is to say that the existence of certain movement models increases the total error, these movement models and the associated parameters are eliminated from the error function. In order to ascertain whether the existence of a movement model increases the total error, the following procedure is adopted:

For each object, a new configuration hypothesis $H_{new}$ is formed regularly on the basis of the previous configuration hypothesis $H_{old}$, which configuration hypothesis no longer contains this object. $H_{new}$ is optimized and the total error is determined. As a general rule, it is to be expected for hypotheses with a distant object that $E_{comp}(H_{new}) < E_{comp}(H_{old})$ and $E_{photo}(H_{new}) > E_{photo}(H_{old})$. It is now checked whether E ($H_{new}$) < E ($H_{old}$), that is to say whether the total error of the new hypothesis is smaller than that of the original hypothesis. If so, the new hypothesis is adopted, that is to say the movement model is removed.

Instead of the complete optimization (that is to say, collective optimization of all model parameters) of a new hypothesis, the following simplification can be carried out, which establishes an upper limit for the total error: only the point assignments of the points are optimized, which were assigned to the eliminated object, and all of the structural and trajectory parameters are retained. This procedure is then very quick.

Initialization of New Point Depths with Known Movement Models

A new point depth can be optimized by a one-dimensional brute-force search via discretized depth values with a subsequent Levenberg-Marquard optimization. The discretization intervals are adapted to the expected convergence radius of the optimization (for instance at a 1-pixel interval from the projections). Alternatively, a combination of the coarse-to-fine approach and brute-force search can be used in order to reduce the runtime:

An image pyramid can be generated for an image, in which image pyramid, e.g., pyramid level 0 corresponds to the original image (with full pixel resolution), pyramid level 1 corresponds to the image with half the pixel resolution (along each image axis), pyramid level 2 corresponds to the image with a quarter of the pixel resolution, and so on.

Starting with a coarse pyramid level (reduced pixel resolution), following a brute-force search, point depth regions are excluded by way of depth values discretized (adapted to the pyramid resolution) at high error values. Following a change to a finer pyramid level, only those point depth regions which have not yet been excluded are evaluated again via a brute-force search. Later, for instance following the conclusion of the finest pyramid level, the best depth hypothesis is refined by means of Levenberg-Marquard. Other remaining hypotheses can be noted in order to indicate ambiguities in the respective point depth.

During the initialization, concealments and other non-modeled influences must be taken account of, for instance by the method in the "Concealments" section, by removing outlier projections, and/or weighting projections, for instance based on an a priori assumption of the probability of concealment as a function of the time interval.

Initialization of New Movement Models and the Point Depths Thereof

Structural and trajectory parameters of new movement models are initially unknown and must be initialized within the convergence radius of the non-convex optimization problem.

The generation of correspondences in a series of images (sparse or dense optical flow) is computation-intensive, and can be prone to errors. The invention also solves the problem of initializing local movement models without the need to explicitly calculate the optical flow between the key cycles.

Possible Problems:

1. The convergence region of the photometric bundle adjustment can be roughly estimated with the region in the parameter space, in which all projections into all images are not further than approximately 1 pixel from the correct projection. That is to say, all parameters of the trajectory (multiple images!) as well as point depths must be initialized sufficiently well so that as many projections of points as possible are already a distance of a maximum of 1 pixel from the correct solution before a Levenberg-Marquardt optimization can be conducted.
2. There are no correspondences or optical flow available for generating an initial movement estimate.

Possible solution: Instead of the global 2-frame coarse-to-fine approach of the DSO, a new local "multi-frame near-to-far/coarse-to-fine approach" is used: Local structural parameters of all key cycles are initialized with 1, trajectory parameters with 0. (Alternatively, a priori assumptions, as well as a superordinate brute-force search can be incorporated for the initial values, as indicated further below).
Initially,
a) only points on a more roughly chosen pyramid level, as well as
b) only the observations thereof, which are temporally/locally close to the respective owner image are evaluated (e.g., initially only observations in the fourth and sixth image are evaluated for a point in the fifth image).

During the bundle adjustment optimization, the resolution is now gradually increased, and more distant observations are increasingly evaluated. The maximally resolved pyramid level as well as all observations are used at the latest in the last iteration. a) and b) in combination ensure a significant expansion of the convergence region in the parameter space: only terms, for which the current condition is (as a general rule) in the region, in which the minimum of the linearization is a good approximation of the actual minimum, are thus evaluated.

During the local multi-frame near-to-far/coarse-to-fine initialization, the structure+trajectory, and point affiliations are optimized alternately. As the resolution increases, the object clustering becomes more accurate.

Since convergence to the global minimum is not always guaranteed even by means of the described approach, a coarse-to-fine brute-force search can additionally be used, similarly to the approach described above for initializing point depths: various initial value hypotheses are optimized starting with a coarse pyramid level and continuously selected by checking the error, so that ideally only the correct configuration hypothesis is fully optimized up to the finest pyramid level.

The discretized starting values necessary for the coarse-to-fine brute-force search can be derived from an a priori object model, which suggests, for instance, regions of typical object trajectories and depths of a convex shape, wherein the camera's intrinsic movement with respect to the rigid background can be "subtracted". Initial point depths of the new movement model can also be derived from optimized depths of the old object clustering with fewer movement models.

Advantages:

In addition to the need to initialize all parameters of multiple frames, the advantages with respect to the 2-frame coarse-to-fine approach of DSO are the implicit utilization of trilinear constraints (>=3 frames) already in the first iteration, which initially lead to line feature-like points constituting a constraint. In this way, the identification of incorrectly assigned points as "external to the model" is also already more reliable in the first iteration. In addition, a coarse-to-fine brute-force search has been added in order to reduce the risk of convergence to local minima. (The photometric bundle adjustment problem is strongly non-convex, that is to say includes local minima).

Concealments
Possible Problem:

Concealments are not modeled in the bundle adjustment error and lead to potentially erroneous object clustering or to erroneous hypotheses.

The modeling of concealments is difficult due to the "sparse" approach.

Possible Solution:

The very dense point distribution utilized for the formation of hypotheses can be utilized to geometrically predict mutual concealment of points. If a concealment of observations is established, these observations are deleted from the error function.

In the multi-object case, an approximate relative scaling must be known for the modeling of concealments between objects, which, e.g., can be estimated with specific domain model assumptions inasmuch as no stereo information is available. The relative scaling of different objects can also be established with the help of an additional detection of concealments or ascertainment of a depth order of the objects. This can, e.g., be realized in that it is ascertained, in the case of a predicted collision or overlapping of two points of two objects, based on the photometric error thereof, which point or which object is in the foreground.

Selection of Points

Points for selection for the (sparse) bundle adjustment are selected in such a way that, as far as possible, all constraints present in the image are utilized even for small objects. For instance, a fixed number of points are selected for each object. This can lead to a very dense point selection for very small objects, and thus effectively almost all of the available relevant image information of the image sections, which depict the object, is utilized.

Viewing the entire spherical angle of a camera image produces a heterogeneous point density, but a uniform density distribution for individual objects.

2. Extension of the Method to a Multi-Camera System

The invention extends the multi-object approach from 1. by multi-camera systems: videos from (one or) multiple synchronized cameras, which are rigidly connected and have potentially different intrinsic properties (e.g., focal length/distortion) and detection regions, are processed in a collective optimization process.

In the context of multi-camera systems, the term key cycle comprises the quantity of images from all cameras that are captured during a camera cycle or at a capture time.

The error function is adapted so that
a) The different camera models, as well as the (previously known) relative positions of the cameras are modeled by different projection functions $\pi_j^m$
b) Position parameters (rotation and translation) with regard to a camera system reference point are estimated (instead of with regard to a camera center) for each time cycle and movement model, and
c) F represents the quantity of all images from all cameras of the selected key cycles, and obs(p) represents the quantity of all images with observations of a point p in all cameras and key cycles (redundant observations can optionally be removed to save computing time). Points can be selected in all images in F.

This formulation or this approach utilizes all available constraints between all images from all cameras, and makes no assumptions about camera system configurations. It can therefore be applied to any base lines, camera alignments, any overlapping or non-overlapping detection regions, as well as considerably heterogeneous intrinsic properties (for instance tele-optics and fisheye optics). One possible application would be a camera system with both wide-angle cameras in all (cardinal) directions and a few telecameras (or stereo cameras) aligned in critical spatial directions.

Tracking by means of direct image alignment is extended to multi-camera direct image alignment. The same changes result as in the photometric multi-camera bundle adjustment:

A trajectory optimization with regard to one camera system reference point (instead of with regard to the camera center) is performed, while the sum of the photometric errors in all cameras is minimized. All available constraints are likewise used, that is to say also photometric errors of inter-camera projections. The projection functions must likewise be adapted specifically to the respective camera model and relative position in the camera system.

Initialization:

Since the minimization of the new error function is also part of the initialization of configuration hypotheses, all available constraints of all cameras are also utilized in the initialization phase. E.g., as a result, the scaling of objects in the overlapping region is automatically determined. If necessary, objects which are initialized in one camera and later arrive in a field of view of a second camera have to be reinitialized if the estimated scaling deviates considerably from the correct value.

3. Visual Odometry with Increased Precision and Scaling

Both the segmentation of the rigid background and the utilization of the multi-camera optimization increase the precision and robustness of visual odometry cf. with DSO, in particular in difficult scenarios with moving objects in large parts of the image, or in scenes with few structures in just one camera.

In the case of camera systems having static or dynamic overlapping regions, the absolute scaling of the visual odometry can be established due to the evaluation of the inter-camera observations of points with a known scale of the relative positions of the cameras.

4. Autocalibration of Intrinsic Photometric, Intrinsic Geometric and Extrinsic Parameters The vignetting can be approximated or modeled parametrically. The same applies to a model of the sensor characteristic. The resulting parameters of each camera can be optimized in the direct multi-object bundle adjustment described above. Due to the high accuracy of the structural and trajectory estimates as well as due to the modelling of self-moving objects, an increased accuracy of the model optimization is to be expected, for instance when compared to the combination with pure visual odometry.

Modeling of distortion and determination of intrinsic geometric parameters: The resulting parameters of each camera can be optimized in the direct multi-object bundle adjustment described above. Due to the high accuracy of the structural and trajectory estimates as well as due to the modeling of self-moving objects, an increased accuracy of the model optimization is to be expected, for instance when compared to the combination with pure visual odometry.

Estimation of extrinsic parameters: The positions of the cameras relative to one another can be optimized in the direct multi-object bundle adjustment described above. Due to the high accuracy of the structural and trajectory estimates, as well as due to the modeling of self-moving objects, an increased accuracy of the model optimization is to be expected, for instance when compared to the combination with pure visual multi-camera odometry.

It should be noted that if a metric reconstruction is to be carried out, at least a distance between two cameras is to be recorded as an absolute metric reference in order to avoid a drift in the scaling.

Initial values of all parameters of the camera calibrations must be established in advance and provided to the method. In this case, it is to be guaranteed that the parameter vector lies within the convergence region of the error function of the coarsest pyramid level thanks to the sufficient accuracy of the initial values. The initial values can, furthermore, flow into the error function together with an a priori distribution in order to prevent application-dependent ambiguities. Furthermore, constraints for the calibration parameters, which would be deleted during the rejection/exchanging of a key cycle, can be retained in a linearized form by means of the method of marginalization used inter alia in DSO.

5. Fusion with Other Sensors and Methods

A fusion with other methods of object recognition (e.g., pattern recognition (deep neural networks, . . . )) promises high potential, since the error distributions of both approaches are uncorrelated to the greatest possible extent. An exemplary application is an object detection, 3D reconstruction and tracking for fusion with pattern recognition-based systems in an automated vehicle having a stereo camera and a surround view camera system.

A fusion with an inertial sensor system and odometry in the vehicle promises high potential for solving the estimation of proper motion (=3D reconstruction of the "object" static surroundings) in critical scenarios, and can make it possible to determine absolute scalings.

A fusion with further environment detection sensors, in particular radar and/or lidar.

6. Uses

Use of 1. to 5. for the detection and tracking of moving road users, reconstruction of the rigid, unmoving vehicle surroundings, as well as the estimation of proper motion by a driver assistance (ADAS) system or a system for automated driving (AD).

Use of 1. to 5. for environment detection and, in a supporting manner, for self-localization in autonomous systems such as robots or drones, in a supporting manner for self-localization of VR goggles or smartphones, 3D reconstruction of moving objects in surveillance (stationary camera, for instance traffic monitoring).

Advantages of the Disclosure and its Embodiments

The proposed method does not require a local correspondence search as a preprocessing step, which constitutes a non-trivial, error-prone and runtime-intensive task.

Compared to indirect methods, the proposed method makes possible an in part significantly increased accuracy of all estimates in critical situations. In multi-object clustering, an increase in the accuracy of the movement estimate leads to a resolution of ambiguities, for instance the separation/identification of two objects which are moving almost identically in the camera image or the direction of movement of which is almost the same.

The lock-on behavior of direct, photometric methods favors convergence of the solution of the single-object problem to the dominant movement model (in contrast to the convergence to a wrong "compromise" solution) if multiple movement models are present at the same time, the second movement model can then be identified as such. This behavior has an advantageous effect when differentiating movement models, and improves the convergence of the multi-object problem to the correct overall solution. This property is not available in classic indirect methods.

Visual odometry is improved by the identification of moving objects: Moving objects are disruptive factors in conventional processes (e.g., DSO). In the new approach, moving objects are automatically identified and eliminated from the estimation of proper motion based on the stationary surroundings.

The method described allows the sampling of pixels from regions affected by contrast, which are also included, to virtually any density. Together with the comparatively high estimation accuracy of movement and structure, this allows objects with a comparatively small spherical angle and comparatively low resolution to be detected and, in particular, to be tracked.

Likewise, this property does not exist in classic indirect methods.

By using the multi-camera extension, the detection region is enlarged, and/or the resolution is increased in an angular range, which leads in each case to an increase in the robustness and accuracy of the overall solution. Furthermore:
- a. By using cameras, the combined detected spherical angle of which is as large as possible (e.g., multi-camera system which covers the entire 360 degrees horizontally), a high degree of accuracy and robustness of the proper motion estimation is achieved.
- b. The combination of a) with additionally one or more cameras having a high range/resolution (telecamera) additionally allows the trajectories of distant objects to be measured more accurately, and to demarcate these from the robust and accurate proper motion estimation (or from the relative movement of the static surroundings) achieved by a).
- c. Overlapping regions of the viewing regions of two cameras are created, in which absolute scalings of the structure can be observed, provided that the positions of the cameras relative to one another are known. By utilizing ideas a) and b), absolute distance estimations are also possible based on the overlapping region of considerably heterogeneous cameras, for instance telecameras and fisheye cameras.
- d. Due to the stereo depth information existing in the overlapping regions, the recognition of moving objects is significantly simplified and also possible in situations that are ambiguous for the mono case, for instance when objects are moving in the same direction, but at different speeds, which is not uncommon, e.g., in roadway traffic.

Dynamic estimation of relevant camera parameters: auto-calibration of intrinsic-photometric, intrinsic-geometric and extrinsic parameters increases the accuracy of the calibrated parameters significantly with respect to a one-time calibration.

A (computer-implemented) method according to the invention for the detection, 3D reconstruction and tracking of multiple rigid objects moving relative to one another from a series of images from at least one camera comprises the following steps:
- a) selecting images at determined capture times (=key cycles) from the series of images from the at least one camera;
- b) collectively optimizing all parameters of a model for describing the rigid objects moving relative to one another based on the images from the key cycles on the basis of sparsely selected pixels in the key cycles, wherein the model comprises parameters for describing the number, 3D structure, positions of the rigid objects in the key cycles and an assignment of the selected pixels to the rigid objects; by
- c) minimizing an error function (S20), wherein the error function comprises a photometric error $E_{photo}$ according to intensities of images of multiple key cycles, and a first a priori energy term $E_{comp}$ according to the number of rigid objects; and
- d) cyclically outputting the number, 3D structure and trajectory of the rigid objects moving relative to one another on the basis of those detected (currently) from the series of images.

The at least one camera can be an individual monocular camera or a multi-camera system. The camera or the multi-camera system can in particular be arranged in a vehicle for detecting the surroundings of the vehicle while the vehicle is being operated. In the case of a vehicle-bound multi-camera system, it can in particular be a stereo camera system or a surround view camera system, in which, e.g., four satellite cameras having a large aperture angle mounted on the four sides of the vehicle guarantee a 360-degree detection of the vehicle's surroundings, or a combination of both camera systems.

As a rule, the entire stationary background is chosen as one of the multiple rigid objects that are moving relative to one another. In addition to the rigid stationary surroundings, at least one further self-moving rigid object is detected, reconstructed in 3D and tracked. The self-moving rigid object consequently moves relative to the stationary "background object". Inasmuch as the at least one camera has also executed a movement during the capturing of the series of images, the stationary background object has moved relative to the camera and, as a general rule, also the self-moving rigid object has moved relative to the camera.

The optimization in step a) is carried out on the basis of sparsely selected pixels or on the basis of a sparse quantity of pixels, that is to say not on the basis of all pixels of an image or image section ("dense") and also not on semi-dense selected image areas. For example, J. Engel et al. show, in LSD-SLAM: Large-Scale Direct Monocular SLAM, ECCV, September 2014, a method with "semi-dense" depth maps. In particular, pixels can be selected, which each make their own contribution to the reconstruction of the movement, for instance by being a minimum distance from other points, and stand out in a characteristic way from their immediate surroundings, so that they can be easily identified in the following images. The 3D structure of a (hypothetical) object corresponds to the spatial geometry of the object. The position of an object corresponds to the position and orientation of the object in the three-dimensional space. The temporal course of the positions of an object corresponds to the trajectory of said object. The output of the parameters which specify the number, 3D structures and trajectories of the objects can preferably be carried out cyclically, in particular "online", meaning in real time or continuously, while new images from the at least one camera are being received. The images can be "processed as quickly as new images are created".

According to a preferred further development of the method, the error function comprises a second a priori energy term $E_{geo}$ according to the geometry (3D structure) of the rigid objects.

The error function may include the following (model) parameters:
an inverse depth for each selected pixel per movement model;
a number of movement models, wherein a movement model is assigned to each currently assumed moving rigid object;
a position (3D position and 3D rotation, i.e., 6 parameters) per movement model and active key cycle; and
an assignment probability of each selected pixel to each movement model.

Following the optimization, the assignment probability for a selected pixel for a movement model is equal to one, and for the remaining movement models is equal to zero.

Optionally, a normal vector of each selected pixel per movement model is taken account of as additional parameters.

The error function may additionally include the following (model) parameters:
- a sensor characteristic for each image, and
- a focal length and principal point for each camera (see, for example, Engel et al. DSO Chapter 2.1 Calibration) so that the collective optimization of all parameters occasions an autocalibration of the at least one camera.

A direct image alignment may be performed with one or more image pyramid levels for the tracking of individual objects. In this case, the relative 3D position and 3D rotation (position) of an object visible in one cycle can be estimated on the basis of images from other cycles and depth estimates by means of three-dimensional image registration and, optionally, by means of a coarse-to-fine approach.

In an advantageous manner, alternately, trajectory and structural parameters are optimized by means of photometric bundle adjustment based on object-specific key cycles (pose per movement model and key cycle) and the affiliation of the pixels to a movement model is optimized, in order to optimize the error function. The selection of the key cycles selected from the series of images for utilization in photometric bundle adjustment can be made specifically for the movement model. For example, the frequency (of the selected images) can be adapted to the relative movement of an object.

The number of movement models may be subsequently optimized, wherein the selected pixels are reassigned to the movement models in the event of a movement model being added to the error function or a movement model being removed from the error function, and the optimization of the error function is restarted.

The at least one camera prefer may execute a movement with respect to the object which corresponds to the stationary rigid background.

In an illustrated embodiment of the method, a multiplicity of series of images is captured by means of a camera system comprising multiple synchronized (vehicle) cameras and provided as input data for the method. A collective optimization of all parameters is performed in order to minimize the resulting error function. The model parameters comprise the positions of each object with regard to the camera system (instead of with regard to a camera). Pixels can be selected from images of all the cameras. Pixels are selected from images of the key cycles of at least one camera.

The observations in at least one camera and at least one key cycle are included as energy terms of the photometric error for selected pixels. In this case, individual geometric and photometric camera models and the relative positions of the cameras to one another are preferably taken account of.

Furthermore, a multi-camera direct image alignment with one or more pyramid levels may be performed for tracking individual objects. The following images are preferably used for this purpose:
a) All images of all cycles, in which the position is already known and where points are selected with known depths. These are repeatedly combined and warped (a prediction of the expected image in the cycle, in which the pose is sought, is created for each camera).
b) All images of the cycle, for which the position is sought. These are in each case repeatedly compared with the prediction image from a) combined for this camera.

The model parameters may include further intrinsic photometric, further intrinsic geometric and/or extrinsic camera parameters of the at least one camera, so that the collective optimization of all parameters occasions an autocalibration of the at least one camera. In other words, an autocalibration/ automatic optimization of intrinsic photometric (for instance, vignetting and sensor characteristic), intrinsic geometric (for instance, focal length, principal point, distortion) and/or extrinsic model parameters of the camera (for instance, relative position of the cameras to one another). Vignetting, sensor characteristic and distortion may be approximated parametrically. All new model parameters can consequently also be determined when minimizing the error function (in one go).

A further subject-matter of the disclosure relates to a device for the detection, 3D reconstruction and tracking of multiple rigid objects moving relative to one another from a series of images of at least one (vehicle) camera received by an input unit. The device includes the input unit, a selection unit, an optimization unit and an output unit.

The selection unit is configured to select images at multiple capture times (=key cycles) (determined by the selection unit) from the series of images.

The optimization unit is configured to
a) collectively optimize all model parameters of a model for describing the rigid objects moving relative to one another based on the images from the key cycles on the basis of sparsely selected pixels in the key cycles, wherein the model comprises parameters for describing the number, 3D structure, positions of the rigid objects in the key cycles and an assignment of the selected pixels to the rigid objects; by
b) minimizing an error function, wherein the error function comprises a photometric error $E_{photo}$ and a first a priori energy term $E_{comp}$ according to the number of rigid objects.

The output unit is configured to cyclically output the number, 3D structure (geometry) and trajectory of the rigid objects moving relative to one another detected by the optimization unit from the series of images.

The device can in particular include a microcontroller or microprocessor, a central processing unit (CPU), a graphics processing unit (GPU), a digital signal processor (DSP), an ASIC (Application Specific Integrated Circuit), a FPGA (Field Programmable Gate Array) and more of the same, interfaces (input and output unit) as well as software for performing the corresponding method steps.

The present disclosure can consequently be implemented in digital electronic circuits, computer hardware, firmware or software.

BRIEF DESCRIPTION OF THE DRAWINGS

Exemplary embodiments and figures are described in greater detail below, wherein.

DETAILED DESCRIPTION

Figure 1:
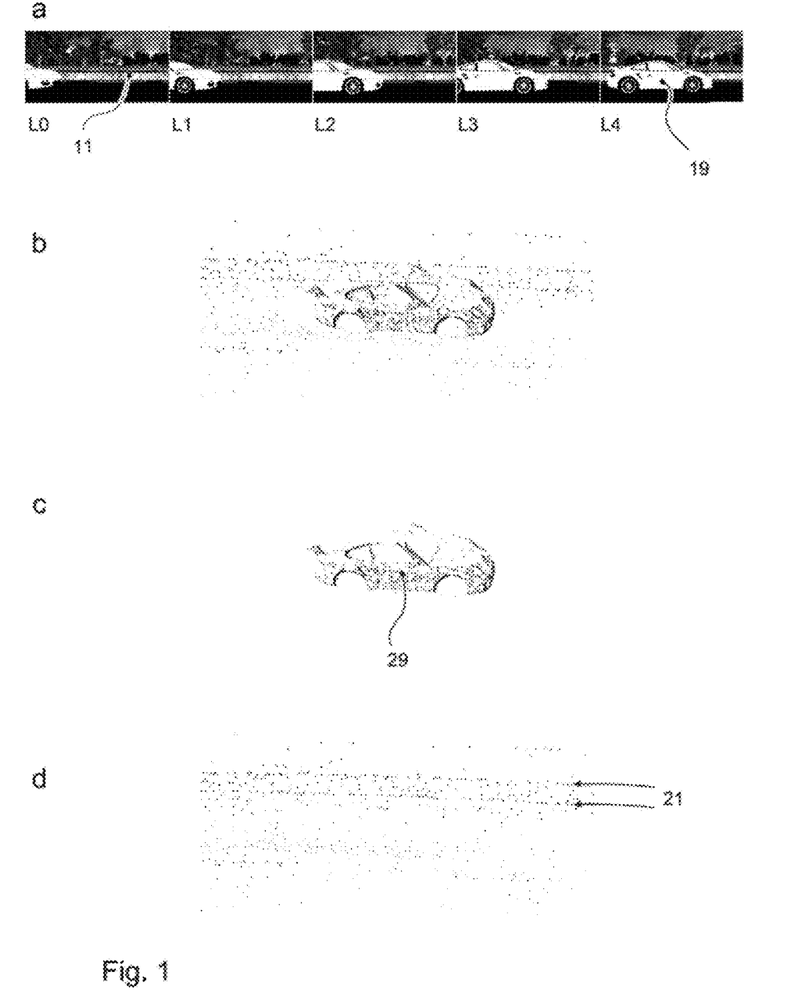
FIG. 1a: shows a sequence of five images from a left side camera of an ego vehicle.
FIG. 1b: shows a 3D reconstruction of the surroundings of the ego vehicle.
FIG. 1c: shows a 3D reconstruction of a first (self-moving) rigid object.
FIG. 1d: shows a 3D reconstruction of a second (stationary) rigid object which corresponds to the stationary background.

FIG. 1a shows a sequence of five images (L0, L1, ..., L4), which have been captured by a left side camera of an ego vehicle while the ego vehicle is driving at capture times t0, ..., t4. A vehicle 19 traveling in an overtaking lane on the left next to the ego vehicle 19 can be seen in the images L0, ..., L4. The left edge of the roadway is delimited by a wall 11. Behind, trees standing next to the roadway can be glimpsed in the upper third of the image. The wall 11, the trees, the roadway as well as lane markings are components of the stationary surroundings of the ego vehicle. The entire stationary surroundings of the ego vehicle are viewed as a rigid object. The depicted vehicle 19 is a self-moving, rigid object which is moving relative to the first object (of the stationary surroundings). The depicted vehicle 19 is traveling faster than the ego vehicle, that is to say is in the process of overtaking the ego vehicle.

If the method is to be performed on the basis of only one camera, one image corresponds in each case to one (capturing) cycle. Assuming the five images are five key cycles for the depicted vehicle (=object to which a movement model is in turn assigned), then these key cycles are referred to as movement model-specific key cycles.

FIG. 1b shows a 3D reconstruction of this scene, which has been attained according to an embodiment of the method. For this 3D reconstruction, however, not only were the key cycles of the left camera, represented in extracts in FIG. 1a, captured, but also the key cycles which were captured at the same capture times t0, ..., t4 by the synchronized rear, front and right camera of the camera system. This will be explained further below in connection with FIG. 2. In FIG. 1b, points can be seen, which do not reflect the 3D conditions completely, but which do reflect them in a roughly recognizable (sparse) manner. The 3D reconstruction was carried out from a viewing angle, at which something is looked down at, compared to the camera direction in FIG. 1a. The (further) vehicle, the spatial shape of which can be easily estimated, and some aspects of the rigid surroundings, in particular the wall, are depicted as two parallel lines behind or above the vehicle. Individual points are provided on the roadway.

FIG. 1c shows the 3D reconstruction of only the further vehicle 29 from FIG. 1b. This vehicle 29 is a moving rigid object. The method makes it possible to reliably track the vehicle 19 from the sequence of images L0, ..., L4. In addition to the 3D position and size, the trajectory of the vehicle 19 can also be determined from the tracking, that is to say in particular the speed and rotation in all three spatial directions.

FIG. 1d shows the 3D reconstruction of only the stationary (unmoving) rigid surroundings of the ego vehicle from FIG. 1b. The stationary rigid surroundings of the ego vehicle are also treated as a (relative) moving rigid object. The localization of the ego vehicle in these surroundings results directly from this. The relative movement of the reconstructed surroundings established with the approach is identical to the inverse proper motion of the ego vehicle. The 3D reconstruction of the wall 11 from FIG. 1a can be seen as two parallel lines 29.

Figure 2:
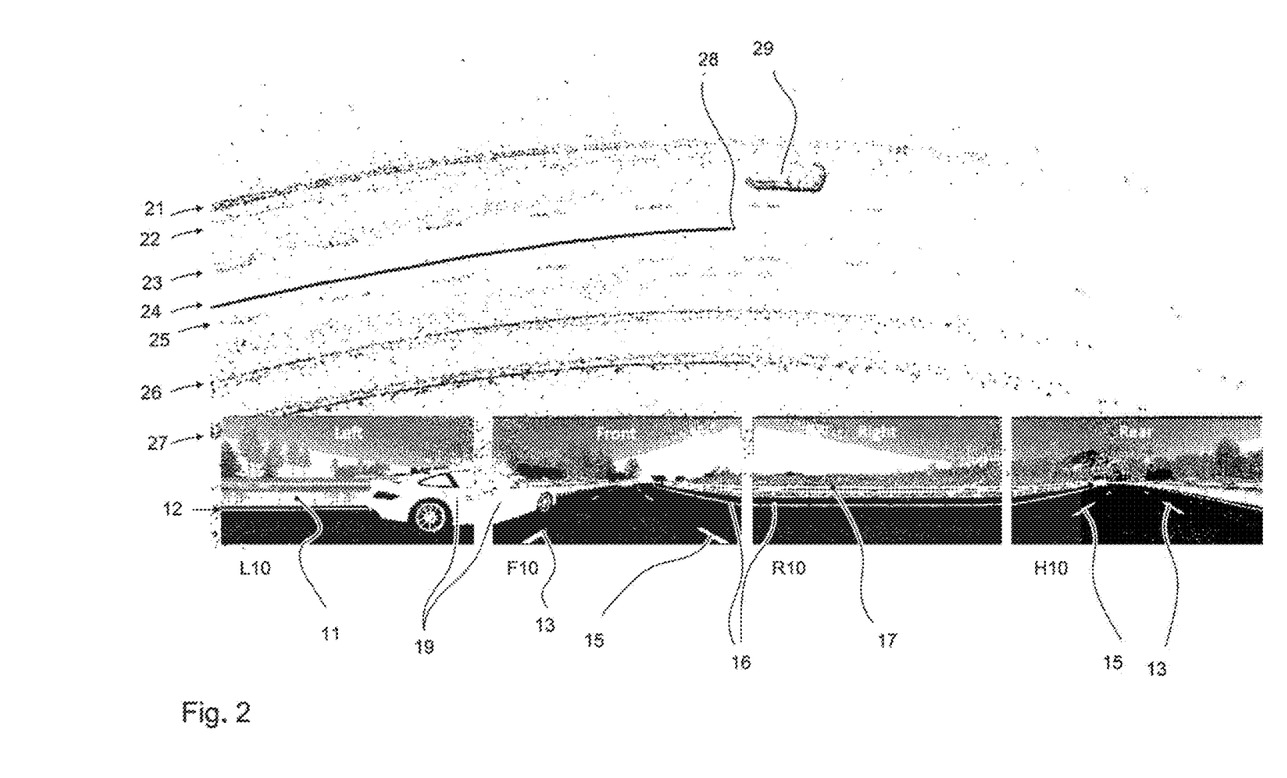
FIG. 2: shows four schematic camera images of a surround view system of an ego vehicle (bottom) and a 3D point reconstruction of the surroundings of the ego vehicle (top)

FIG. 2 shows four schematic camera images L10, F10, R10, H10 of a surround view system of an ego vehicle at the bottom, and a 3D point reconstruction of the surroundings of the ego vehicle at the top.

A rectified image L10 of a vehicle camera looking to the left can be seen on the left at the bottom. Next to that, the rectified images F10, R10, H10 of a vehicle camera looking forward, looking to the right and looking rearward are depicted. The black roadway surface with white roadway markings 12, 13, 15, 16 in the respective viewing region can be seen in each case in all four images L10, F10, R10, H10. A further vehicle 19 is driving diagonally to the left in front of the ego vehicle. The rear part of the further vehicle 19 is detected in image L10 from the left camera, the front part in image F10 from the front camera. The depicted vehicle 19 is a self-moving rigid object. In image L10 from the left camera, a wall 11 can again be seen as the roadway edge boundary between the roadway and the landscape (trees, hills) surrounding the roadway. Below the wall 11, a solid lane boundary marking (line) 12 is depicted, which delimits the edge of the left lane of the three-lane roadway. In image F10 from the front camera of the surround view system, a left 13 and a right 15 dashed lane marking are depicted, which delimit the left and right edge of the middle lane on which the ego vehicle is currently driving. The right edge of the roadway is marked by a further solid lane boundary marking 16. In image R10 from the right camera, a guardrail 17 is depicted as a roadway edge boundary; the right lane boundary marking 16 can be seen therebelow. It can likewise be seen from image H10 from the rear camera that the ego vehicle is driving on the middle of the three lanes; here, too, between the two solid lane boundary markings (not numbered in image R10), the right lane marking 15 on the left in the image and the left lane marking 13 of the ego lane on the right in the image can be seen as dashed lines. The sky can be glimpsed in the upper part of all four images. The wall 11, the roadway markings 12, 13, 15, 16 and the guardrail 17 are components of the stationary surroundings of the ego vehicle. The entire stationary surroundings of the ego vehicle are viewed as a rigid object.

During the journey of the ego vehicle, sequences of images (videos) are captured by each of the four cameras. From these sequences of images, a 3D reconstruction of the scene according to an embodiment of the method has been attained with multiple (synchronized) cameras. Points that represent the 3D relationships can be seen at the top in FIG. 2. The visualization was carried out from a bird's eye view (top view). The previous trajectory of the ego vehicle is illustrated as a solid line 24. This line is not a component of the 3D structures, however it visualizes the reconstructed trajectory of the camera system of the ego vehicle. The right end 28 of the line 24 corresponds to the current position of the ego vehicle, which is not itself represented in FIG. 2. The outlines of the further vehicle 29 can be seen on the left in front of (or on the right above, at the top in FIG. 2) the ego vehicle. The moving object can be tracked robustly and very precisely, so that its properties can be established for systems for assisted or automated driving for the ego vehicle. The following elements can be inferred from the 3D reconstruction as parts of the unmoving background (from top to bottom): the wall (boundary of the left lane edge) as a somewhat denser and somewhat more extensive line 21 (consisting of points), the left solid lane boundary marking 22, the left dashed lane marking 23 of the ego lane, the right dashed lane marking 25 of the ego lane, the right solid lane boundary marking 26 and the, in turn, somewhat denser and more extensive line 27 with individual posts of the guardrail. The hard shoulder of the roadway is located between the right solid lane boundary marking 26 and the guardrail "line" 27.

Figure 3:
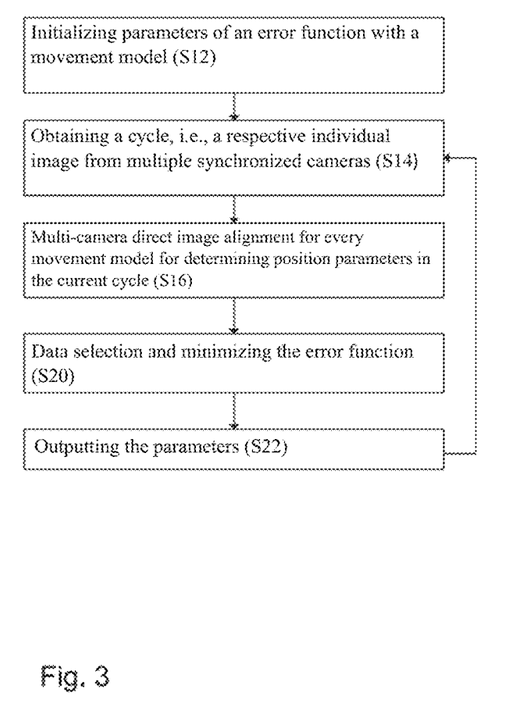
FIG. 3: schematically shows a sequence of a method for a multi-camera system.

FIG. 3 shows, by way of example, the sequence of an exemplary embodiment of the method for a multi-camera system. A comparable method with individual modifications can also be applied to a mono camera system.

In a first step S12, parameters of an error function are initialized. The error function serves to calculate an error for individual images of a cycle as a function of parameters. A minimization of the error function thus provides the parameters which the model optimally adapts to the individual images. Parameters are:

Depth parameters of multiple points of multiple images for multiple objects

Optional: normal vector of each selected point (2 parameters per point)

Number of movement models

Multiple movement models (in each case 3+3 parameters for position and rotation in each case for each time step), wherein a movement model is assigned to an object. The rigid background (i.e., the unmoving surroundings in real space) is likewise treated as an object. A movement model is also assigned to the background object.

Assignment of points to movement models (1 parameter per point and movement model, by means of soft assignment or, optionally, hard assignment)

Estimation of sensor characteristics, and

Estimation of focal length and principal point.

The parameters can be initialized by choosing 1 for the number of movement models, the trajectory is initialized with 0, and the inverse depths are initialized with 1, and a coarse-to-fine initialization is hereby conducted.

In a step S14, new individual images of a cycle are obtained from multiple synchronized cameras. A cycle describes the quantity of images which are created by the synchronized cameras in a capture cycle (corresponds to a capture time). The new individual images are provided to the method or to the system, e.g., by the cameras, a memory or the like.

In a following step S16, a multi-camera direct image alignment is performed for each currently available movement model (corresponding to a currently assumed object or to a current object hypothesis) in order to determine the movement parameters in the current cycle (with the new individual images). For example, it can be assumed that a moving rigid object is currently moving relative to the stationary rigid background. Since the stationary background is likewise treated as a moving rigid object, this is the simplest case for multiple, namely two differently moving rigid objects. The cameras can execute a movement with respect to the stationary background, so that in the series of the individual images the background is not stationary in the camera system coordinate system, but rather executes a relative movement. Every currently assumed object is described by a movement model. The (position) parameters for each object for the new (i.e., current) cycle are determined by means of multi-camera direct image alignment. Direct image alignment is not the same as bundle adjustment, but it does have similarities with photometric bundle adjustment: the photometric error function to be minimized is the same. In the case of direct image alignment, the depths are not optimized, but rather are presumed to be known and only the new position is estimated, while a photometric error (difference of gray-scale values) is minimized. In this case, predictions of the images of a new cycle are generated iteratively by means of image warping or similarly to a 3D rendering (on the basis of old images, known structure, trajectory), and the latest object pose is adapted until the prediction is most similar to the new images. More details on homography-based single camera direct image alignment can be found for example, at: https://sites.google.com/site/imagealignment/tutorials/feature-based-vs-direct-image-alignment (accessed on Dec. 3, 2019).

Subsequently, in step S20, data (key cycles, pixels) are selected and the error function is minimized. Details regarding this are explained in greater detail below. The parameters obtained in this way are output in the following step S22. It is subsequently possible to continue with step 14, that is to say the receipt of new individual images of a new cycle.

Figure 4:
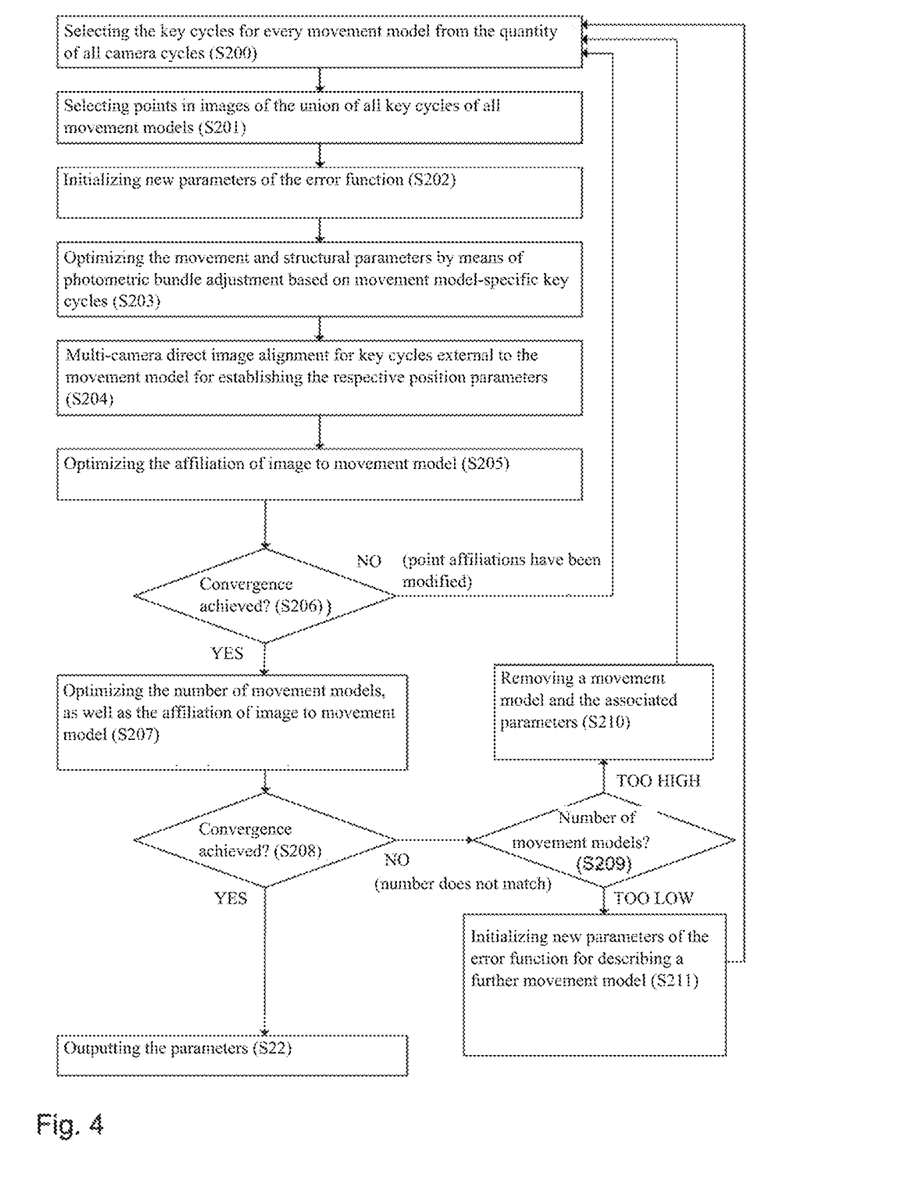
FIG. 4: shows a schematic diagram regarding the sequence of a method for data selection and minimizing of the error function for a cycle of individual images.

FIG. 4 shows a schematic diagram regarding the sequence of a method for data selection and minimizing the error function (S20 in FIG. 3) for a cycle of individual images and subsequently outputting the parameters (S22).

In a first step S200, key cycles are selected for each movement model (corresponding to an object) from the quantity of all camera cycles.

In a step S201, points in images of the key cycles of all movement models are selected.

In a step S202, new parameters of the error function for describing further point depths and point affiliations are initialized.

In step S203, the movement and structural parameters for each object are optimized by means of photometric bundle adjustment based on object-specific key cycles.

In step S204, a multi-camera direct image alignment for object-external key cycles is performed.

In step S205, the affiliation of a pixel to an object or movement model is optimized.

In a following step S206, it is checked whether (sufficient) convergence has been achieved. If this is not (yet) the case, since the point affiliations have been modified, the process continues with step S200.

If convergence has been achieved, the number of movement models (objects) as well as the affiliation of a pixel to a movement model are optimized in the following step S207.

In a following step S208 it is checked whether (sufficient) convergence has been achieved in this regard.

If the number does not match, the number of movement models is verified in a following step S209.

Inasmuch as the number is too high, a movement model and the associated parameters are removed in step S210, and the method is continued with step S200. This can be done as follows:

For each object, a new configuration hypothesis is regularly evaluated, which no longer contains this object. It is checked whether the total error is reduced as a result. If so, the configuration is adopted or the object is removed.

An upper limit for this new total error can be established by only optimizing the point assignments of the points concerned, and all structural and trajectory parameters are retained. This procedure is then very quick (cf. with the complete optimization of such new hypotheses with a missing object). See also the section above: Formation of hypotheses (2): Elimination of a movement model.

Inasmuch as the number is too low, new parameters for describing a further movement model (object) of the error function are initialized in step S211 (see above: Formation of hypotheses (1): Detection of a further movement model) and the method is continued with step S200.

Inasmuch as the number matches, that is to say convergence has been achieved in step S208, the parameters are output in step S22.

Figure 5:
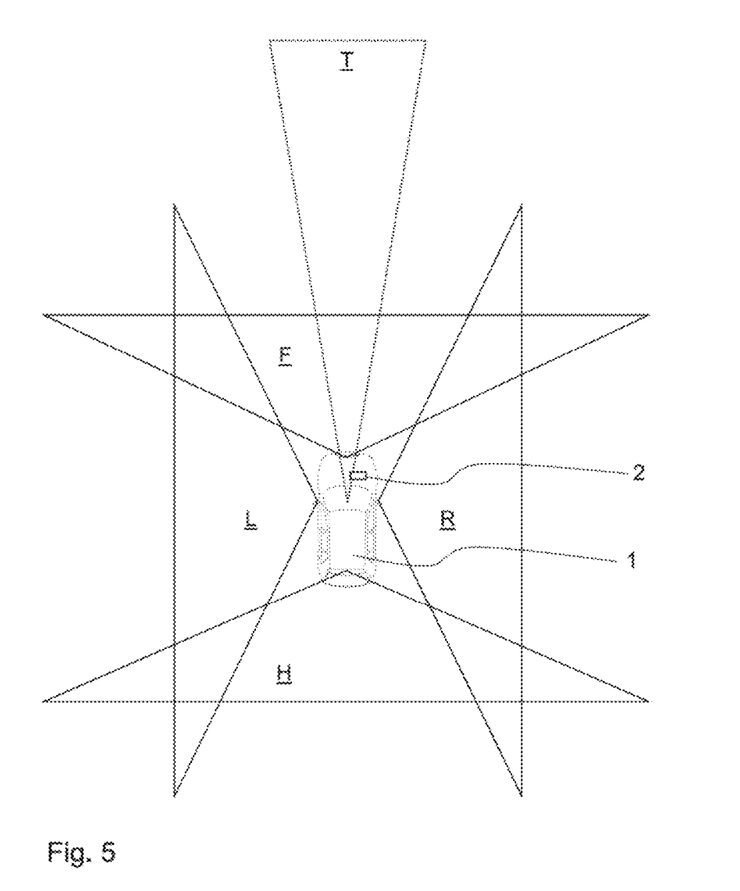
FIG. 5: shows an ego vehicle having a surround view camera system, a front telecamera and a device for the detection, 3D reconstruction and tracking of multiple rigid objects moving relative to one another.

FIG. 5 shows an ego vehicle 1 having a surround view camera system, a front telecamera and a device 2 for the detection, 3D reconstruction and tracking of multiple rigid objects moving relative to one another. The detection regions of the four individual cameras of the surround view system are illustrated by the four triangular faces (L, F, R, H) around the ego vehicle 1. The triangular face L (F, R, or H) on the left (front, right or rear) side of the ego vehicle corresponds to the detection region of the left (front, right or rear) camera of the surround view camera system. In the region of the windshield of the vehicle 1, a telecamera is arranged, the detection region T of which is depicted as a triangle with dotted lines. The telecamera can be, for example, a stereo camera. The cameras are connected to the device 2 and transmit the captured images or sequences of images to the device 2.

The invention claimed is:

1. A method for detection, 3D reconstruction and tracking of multiple rigid objects moving relative to one another from a series of images from at least one camera, comprising:
    selecting, by processor circuitry, images at determined capture times (key cycles) from the series of images from the at least one camera;
    collectively optimizing, by the processor circuitry, all parameters of a model for describing the rigid objects based on the selected images from the key cycles on a basis of sparsely selected pixels in the key cycles, wherein the model comprises parameters for describing a number, a 3D structure, and positions of the rigid objects in the key cycles and an assignment of the sparsely selected pixels to the rigid objects; by
    minimizing, by the processor circuitry, an error function, wherein the error function comprises a photometric error $E_{photo}$ according to intensities of images of multiple key cycles, and a first a priori energy term $E_{comp}$ according to the number of the rigid objects; and
    outputting, by the processor circuitry, the number, the 3D structure and a trajectory of the rigid objects from the series of images.

2. The method according to claim 1, wherein the error function comprises a second a priori energy term $E_{geo}$ according to the 3D structure of the rigid objects.

3. The method according to claim 1, wherein the error function comprises the following model parameters:
    an inverse depth for each sparsely selected pixel per movement model;
    a number of movement models, wherein a movement model is assigned to each currently assumed rigid object;
    a position per movement model and active key cycle; and
    an assignment probability of each sparsely selected pixel to each movement model.

4. The method according to claim 3, wherein the error function additionally comprises the following model parameters:
    a sensor characteristic for each selected image, and
    a focal length and a principal point for each of the at least one camera so that the collective optimization of all parameters occasions an autocalibration of the at least one camera.

5. The method according to claim 1, wherein a direct image alignment is performed by the processor circuitry with one or more image pyramid levels for tracking of individual objects.

6. The method according to claim 1, wherein, alternately, trajectory and structural parameters are optimized by the processor circuitry by a photometric bundle adjustment based on object-specific key cycles and an affiliation of pixels to a movement model is optimized by the processor circuitry, in order to optimize the error function.

7. The method according to claim 6, wherein a number of movement models is subsequently optimized by the processor circuitry, wherein in an event of a movement model being added to the error function or of a movement model being removed from the error function, a new assignment of the sparsely selected pixels to movement models is conducted by the processor circuitry, and the optimization of the error function is restarted by the processor circuitry.

8. The method according to claim 1, wherein the at least one camera executes a movement with respect to an object which corresponds to a stationary rigid background.

9. The method according to claim 1, wherein a multiplicity of series of images is captured with a camera system comprising multiple synchronized cameras, wherein the parameters of the model comprise the positions of each rigid object with regard to the camera system, wherein pixels are selected from all cameras of the camera system, wherein pixels are selected from images of the key cycles of at least one camera of the camera system, wherein observations in the at least one camera of the camera system and at least one key cycle of the key cycles are included as energy terms of the photometric error for selected pixels, and wherein a collective optimization of all parameters of the model is performed by the processor circuitry in order to minimize the error function.

10. The method according to claim 9, wherein a multi-camera direct image alignment is performed by the processor circuitry with one or more image pyramid levels for tracking of individual objects, wherein the collective optimization of all the parameters of the model is performed by the processor circuitry in order to minimize the error function, wherein the parameters of the model comprise the positions of each rigid object with regard to the camera system, wherein observations in the at least one camera of the camera system of the cycle to be optimized are included as energy terms of the photometric error for selected pixels.

11. The method according to claim 10, wherein the parameters of the model comprise further intrinsic photometric, further intrinsic geometric and/or further extrinsic camera parameters of the at least one camera of the camera system so that the collective optimization of all parameters of the model occasions an autocalibration of the at least one camera of the camera system.

12. A device for detection, 3D reconstruction and tracking of multiple rigid objects moving relative to one another from a series of images from at least one camera received by an input unit, comprising the input unit, a selection unit, an optimization unit, and an output unit, wherein
    the selection unit comprises processor circuitry that is configured to select images at determined capture times (key cycles) from the series of images from the at least one camera;
    the optimization unit comprises the processor circuitry that is configured to
        collectively optimize all model parameters of a model for describing the rigid objects moving relative to one another based on the selected images from the key cycles on a basis of sparsely selected pixels in the key cycles, wherein the model comprises parameters for describing a number, a 3D structure, and positions of the rigid objects in the key cycles and an assignment of the sparsely selected pixels to the rigid objects; by minimizing an error function, wherein the error function comprises a photometric error $E_{photo}$ and a first a priori energy term $E_{comp}$ according to the number of the rigid objects; and the output unit comprises the processor circuitry that is configured to output the number, the 3D structure and a trajectory of the rigid objects from the series of images.

* * * * *